United States Patent [19]

Mancuso et al.

[11] Patent Number: 5,619,271

[45] Date of Patent: Apr. 8, 1997

[54] FUZZY LOGIC BASED SCANNING RATE CONVERTER

[75] Inventors: Massimo Mancuso, Monza; Rinaldo Poluzzi, Milan; Gianguido Rizzotto, Civate, all of Italy

[73] Assignees: SGS-Thomson Microelectronics S.r.l., Agrate Brianza; Consorzio per la Ricerca sulla Microelettronica nel Mezzogiorno, Catania, both of Italy

[21] Appl. No.: 427,082

[22] Filed: Apr. 21, 1995

[30] Foreign Application Priority Data

Apr. 27, 1994 [EP] European Pat. Off. .............. 94830197

[51] Int. Cl.$^6$ ................................................ H04N 7/01
[52] U.S. Cl. ........................................ 348/448; 348/452
[58] Field of Search ................................ 348/448, 452, 348/447, 441, 458, 459, 443; 382/156; 395/917; H04N 7/01

[56] References Cited

U.S. PATENT DOCUMENTS 5,184,218  2/1993  Gerdes ...................... 358/133

5,295,077  3/1994  Fukuoka ...................... 358/479

FOREIGN PATENT DOCUMENTS 0488003  6/1992  European Pat. Off. ......... H04N 5/44

OTHER PUBLICATIONS

European Search Report for European Patent Application 94 83 0197 filed Apr. 27, 1994.
Patent Abstracts of Japan, vol. 17, No. 545 (E–1442), Sep. 30, 1993 & JP-A-05 153 563 (Matsushita).
Patent Abstracts of Japan, vol. 17, No. 331 (E–1386) Jun. 23, 1993 & JP-A-05 037 910 (Victor Co of Japan).

*Primary Examiner*—Victor R. Kostak
*Attorney, Agent, or Firm*—David M. Driscoll; James H. Morris

[57] ABSTRACT

A television signal scanning conversion device of the type comprising at least one filtering block having a plurality of digital inputs which receive through an interface components of an interlaced television signal comprises also at lease one calculation block connected to the signal inputs and operating with fuzzy logic. The calculation block is capable of executing a switch between at least two different interpolation procedures, to wit interfield and intrafield.

23 Claims, 4 Drawing Sheets

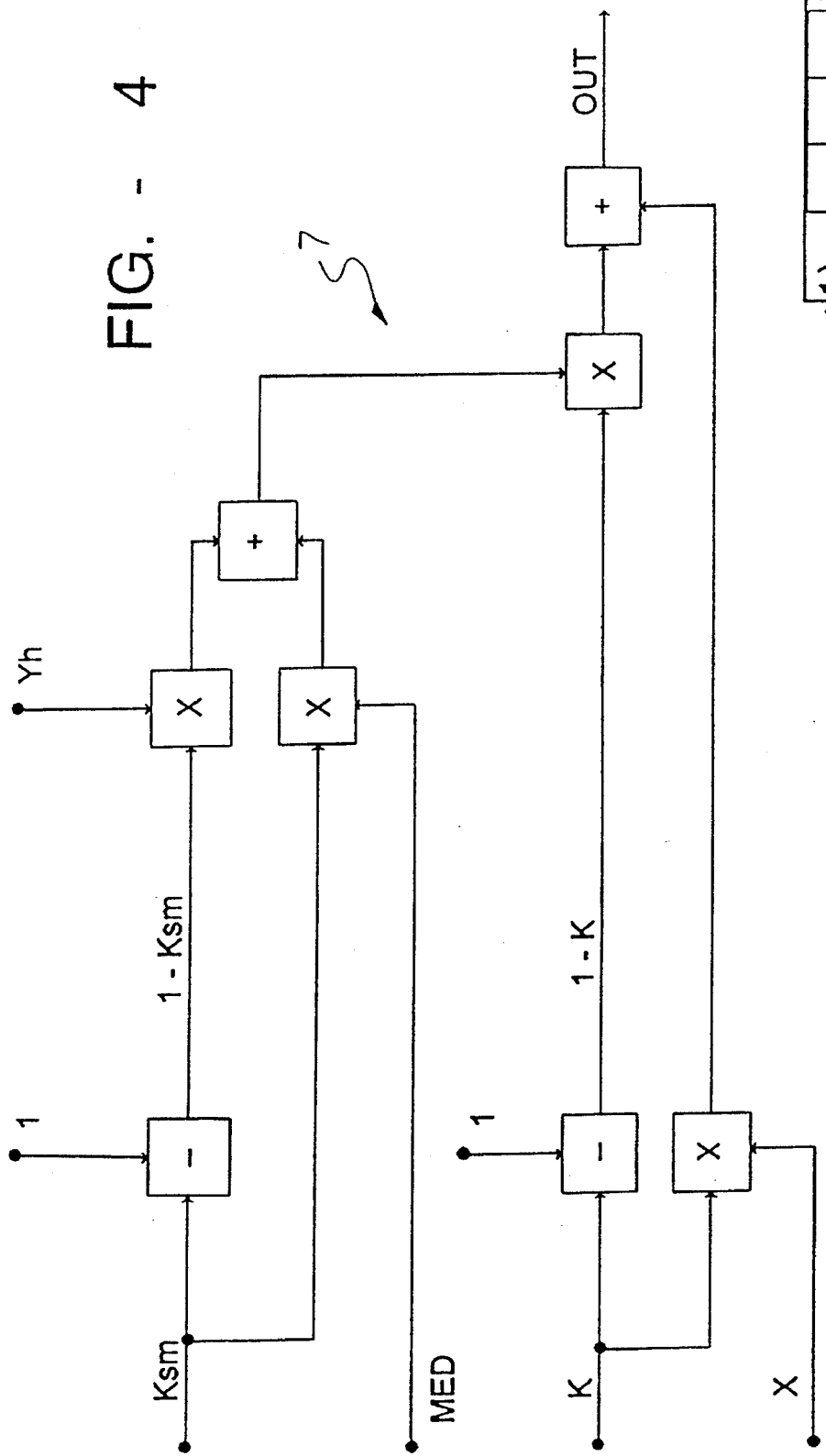

FUZZY LOGIC BASED SCANNING RATE CONVERTER

BACKGROUND OF THE INVENTION

1. Field of the Invention

The present invention relates to a television signal scanning conversion device. Specifically the present invention concerns a device comprising at least one filtering block having a plurality of digital inputs which receive, through an interface, components of a three-dimensional television signal.

2. Discussion of the Related Art

In this specific technical area it is known that image quality improvement in television receivers is correlated with the amplitude of the signal band. A problem which limits the good quality of the video signals is the reduced amplitude of the signal band.

Already upon generation of the television signal, e.g., inside the television camera, there arise problems related to the occupation of the signal band.

It is important that the signal reproduce the scene in the best possible manner; which signifies a compromise solution between reproduced image quality and small band occupation. Various compromise solutions of this type have then been translated into different standards which however still use a particular combination of time and space sampling which leads to the constitution of an image having a so-called interlaced format.

While fulfilling the purpose, this sampling combination introduces also some artifices well known to those skilled in the art and known as 'interline flicker', 'large area flicker', 'line crawl' and 'raster visibility'.

To obviate these shortcomings it is possible to use some measures based essentially on interpolation algorithms which take from the receiver the missing information without increasing the transmission band.

Before discussing the aspects linked to the use of these interpolation processes, it should be recalled that the television signal is a three-dimensional signal having two spatial dimensions, i.e. one horizontal and the other vertical. A third time dimension allows reconstruction of the motion of the scene shot and reproduction then of images in motion. We shall define below as an image field an assembly of rows which constitute a television image in a same time interval equal to the field scanning time. The number of rows in a field is equal to half the total number of rows and therefore an 'odd field' and an 'even field' are distinguished depending on whether each field consists of the odd or even rows of the image. The term 'frame' indicates the whole of two fields spaced by a time interval equal to the time sampling period.

The time extension of course permits reproduction of the motion which characterizes the objects present in the scene shot. But because of the motion it is not possible to utilize the highest resolution of the raster by superimposing two fields. Between the fields, indeed, there is a time interval equal to a time sampling period and hence they are in general for two different images, at least if an object has moved.

Therefore the superimposition of the two fields, if there has been motion, is not an acceptable solution just because different images are superimposed.

Returning now to the problem of limited band amplitude, this problem must be considered with reference to the three dimensions of the signal and the use of the interpolation processes which allow operation of a space-time filtering of the signal. These interpolation processes fall into two broad classes depending on how they allow for the image movement information, A first class consists of the processes which do not allow for movement and hence make use of the information present in the same field and therefore are called 'intrafield' type.

The second class consists of processes which make use of the information present in two consecutive fields, detecting the presence of motion, and are called 'interfield' type.

If in the image sequence there is no movement, the highest possible resolution is obtained by superimposing the two fields (field insertion). But if there is movement, the highest possible resolution is obtained by taking the missing information from the pixels belonging to the same field (intrafield) allowing for the presence of special structures such as for example fronts.

These problems linked to television signal interlacing can be considered as related to the attempt to improve the resolution of the signal. The known art already proposes some solutions which are basically intended to increase signal resolution.

For example, the time resolution can be increased by doubling the image field frequency by means of a scanning rate converter (SRC). There are in particular two classes of processes of this kind:

1. Interlaced-to-progressive conversion (IPC) which aims at increasing the spatial resolution by doubling the number of rows for each field, and 2. frame-rate-up conversion (FRU) which aims at increasing the time resolution by increasing the number of fields shown in the time unit.

In any case, whether application of an IPC or an FRU procedure is desired, a shortcoming is that it is necessary to find the spatial information, i.e. the values of the missing pixels. Therefore, while advantageous in some ways, these techniques do not yet provide good filtering by adaptive procedures.

SUMMARY OF THE INVENTION

The present invention provides a scanning rate conversion process and device which, through the use of fuzzy logic and allowing for the output of a motion detector, chooses which of the two modes, interfield or intrafield, is better suited to a given television signal. Using such a process or device, high video image resolution may be obtained while at the same time overcoming problems associated with the prior art. Additionally, if the choice is an intrafield procedure, the process does not affect the structure of the fronts to which is owed a high information content.

Accordingly, one aspect of the present invention is a device including at least one filtering block having a plurality of digital inputs which receive at least one component of an interlaced television signal and an output providing filtered components of the television signal. At least one calculation block is connected to the digital inputs and operates with fuzzy logic procedures to provide an output to control said at least one filtering block to select at least one of two different interpolation processes to generate the filtered components.

Another aspect of the present invention is a device with an interface having an input for receiving a current pixel of a television signal and an output providing a plurality of signals indicative of pixels in the television signal around the first pixel. A first processor has an input for receiving the plurality of signals and an output providing a switching signal according to a function of the plurality of signals. A second processor performs an interpolation function on the current pixel of the television signal according to the switching signal, wherein the second processor performs a first interpolation function when the switching signal is in a first state and a second interpolation function when the switching signal is in a second state.

Another aspect of the present invention is a method for television signal scanning conversion. In this process, the components of an interlaced television signal are received and fuzzy logic procedures a performed to determine a value. At t least one of two different interpolation processes is performed on the received components of the interlaced television signal according to the determined value.

BRIEF DESCRIPTION OF THE DRAWINGS

These and other characteristics and advantages of the process and device in accordance with the present invention are set forth in the description of an embodiment thereof given below by way of example and not of limitation with reference to the annexed drawings, in which FIG. 4 shows the internal structure of another detail of the example of FIG. 1, and FIG. 5 shows schematically a work window of the device in accordance with the present invention.

DETAILED DESCRIPTION

Figure 1:
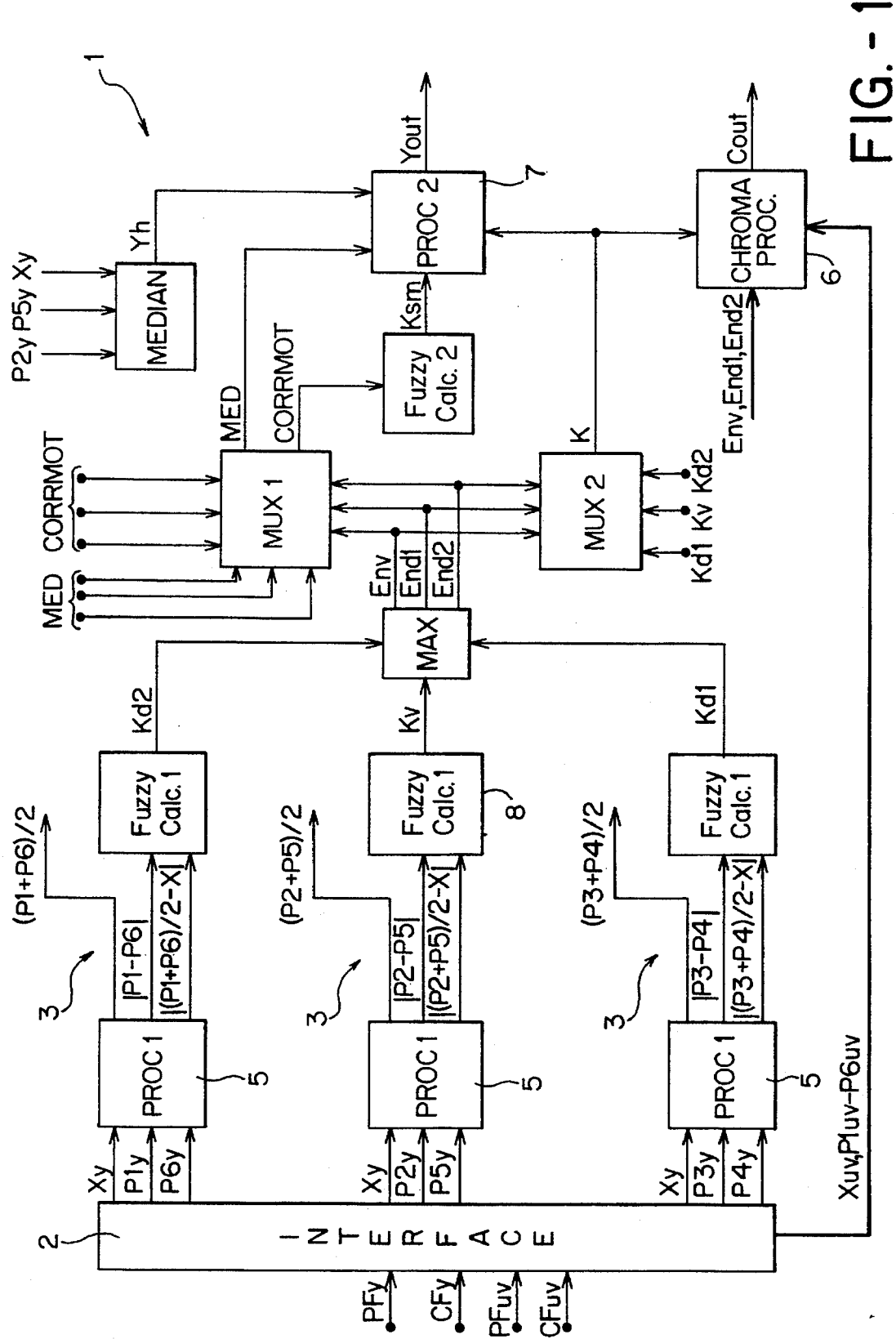
FIG. 1 shows a schematic view of a conversion device provided in accordance with the present invention.

Referring now to FIG. 1, reference number 1 indicates globally and schematically a device provided in accordance with the present invention for television signal scanning rate conversion.

The television signal is three-dimensional and in interlaced format. This signal comprises three components: Y for the luminance signal and two others, U and V, for the chrominance signal. In the device, these three components undergo different types of processing. The components U, V and Y are each codified with one byte (8bits) and called for in a 4:4:4 format.

The device 1 is equipped with at least four digital data inputs: CFy, CFuv, PFy and PFuv. Specifically the inputs CFy and CFuv are the sampled luminance/chrominance signals for a current image field while the inputs PFy and PFuv are the corresponding signals of an immediately preceding image field. Briefly, these data identify a work window, or image window, centered in a pixel x to be processed as shown in FIG. 5, described in more detail below.

All of these inputs belong to an interface 2 which a plurality of outputs Xy, Piy, directly connected to branches 3 of a filter operating with fuzzy logic procedures.

Additional outputs Xuv and Piuv of the interface 2 are connected to corresponding inputs of a chroma processor block 6 which also receives selection signals from a maximum component 8 of the filter.

Figure 2:
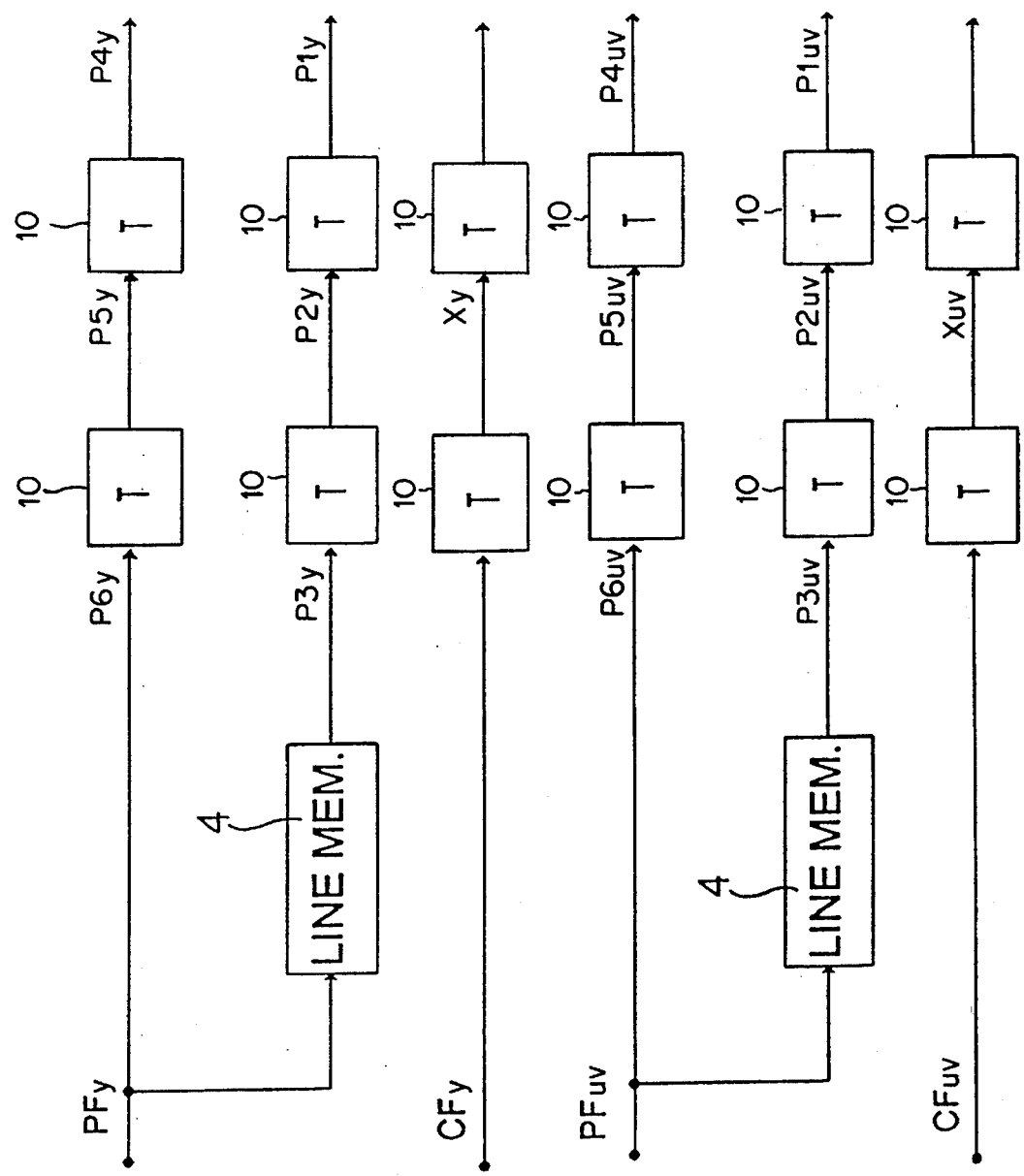
FIG. 2 shows in detail a schematic view of a detail of the device of FIG. 1.

FIG. 2 shows in greater detail the internal structure of the interface 2 responsible for creation of the work window of FIG. 5.

As clearly shown in FIG. 2, the interface 2 comprises line memories 4 and delay blocks T. A line memory 4 is associated with each type PF input while the delay blocks 10 allow taking a series of identical signals each of which is sequentially delayed in relation to the preceding one by a predetermined time period T. These signals are the outputs Piy and Piuv of the interface 2.

The outputs Xy and Xuv of the interface 2 correspond to the delayed inputs CFy and Cfuv by means of a single delay by a time period T.

The device 1 operates on the luminance components (luma) of the video signal by making use of the fuzzy logic signal processing criteria. The luminance contains the luminosity information associated with the image, i.e. the part of the image in grey tones.

A plurality of parallel branches 3 each incorporating an arithmetic block 5 also indicated by the initials PROC1 are provided for receiving each a sub-assembly of the signals Xy and Piy. A calculation block CALC1 is cascade connected with the preceding arithmetic block 5 and is designed to perform fuzzy logic inference operations. The structure of the calculation block CALC1 is in itself conventional being provided by a fuzzy machine which performs inference operations among logical variables received at its input.

There are three fuzzy logic operation blocks CALC1 for provision of the inferences for the fuzzy process for each Df the directions considered. Each block has two inputs (the parameters Corr and CorrMot for each direction) and an output k.

Basically, in the block CALC1 are performed inference operations which, based on luminosity levels of image portions and grey shades of pixels, originate an image contrast factor k.

The blocks 5 are in turn three and perform arithmetic operations on the pixels Pi, Pj and X to calculate a series of parameters indicated below by the initials Corr, CorrMot and Med for each of the directions considered.

Corr is the module of the difference between Pi and Pj: Corr=|Pi–Pj|; CorrMot is the module of the difference between the value (Pi+Pj)/2 and the signal X: CorrMot=|(Pi+Pj)/2–X|; Med is the weighted average of Pi and Pj: Med=(Pi+Pj)/2.

Figure 3:
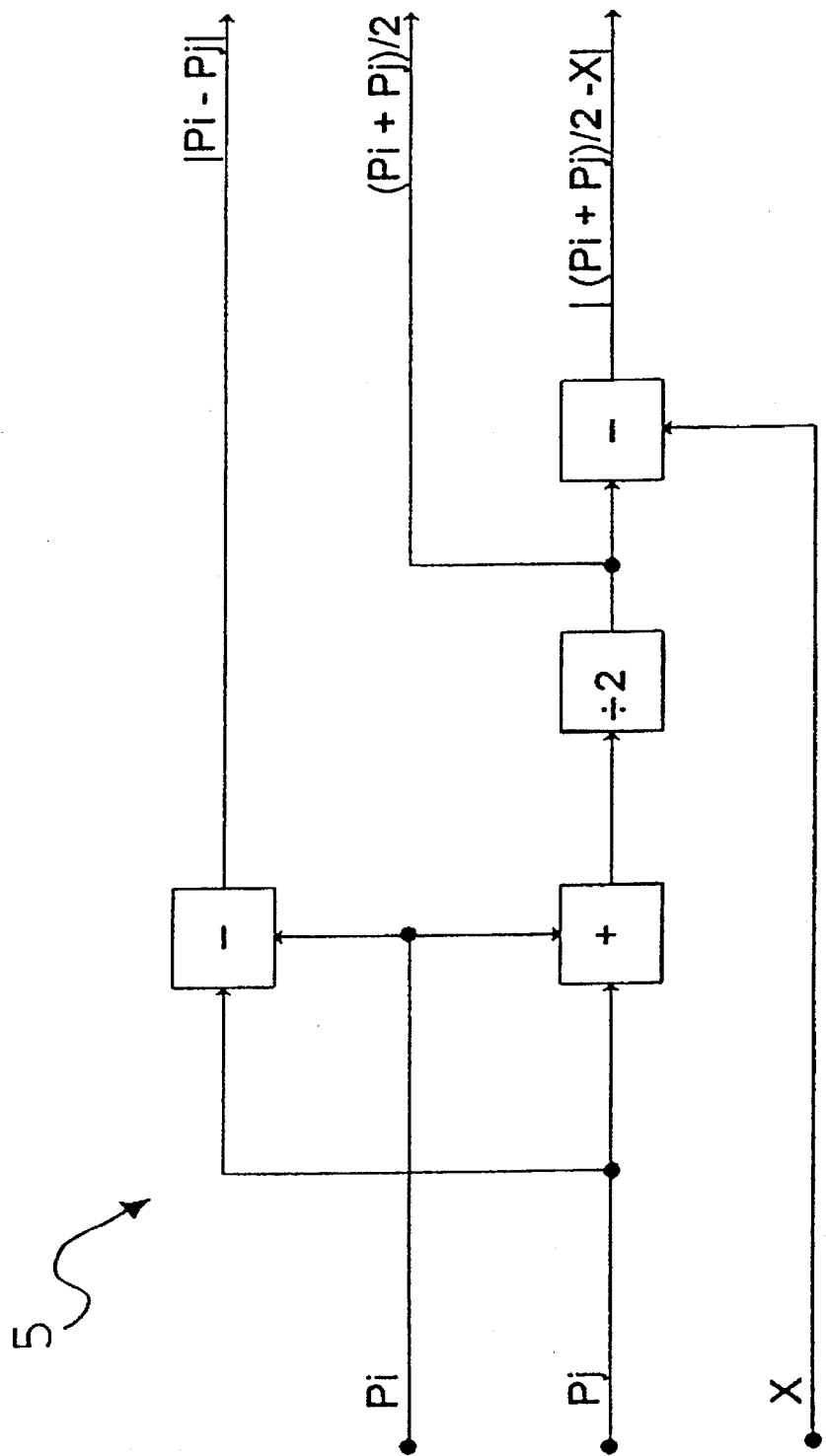
FIG. 3 shows in detail a schematic view of an arithmetic block inserted in the device of FIG. 1.

The architecture of the generic block 5 is shown schematically in FIG. 3 where each block has three input and three output signals.

The branches 3 all lead to a block MAX which takes the highest value among all those received in input.

Specifically the block MAX receives three parameters Kv, Kd1, kd2, determines the highest, and places one of the three output signals at logic level 1. Each of he three output signals is related to one of the directions considered. Depending on which of the values received at input is the highest value, the block MAX selects one of its own outputs Env, End1, End2, enabling a corresponding output line.

Each of the output lines provides a T branch which connects together bidirectionally two multiplexers MUX1 and MUX2 whose job is to select parameters for the direction of highest correlation.

The first block MUX1 has nine inputs of which three are for selection. Two outputs select the parameters Med and CorrMot for the selected direction.

The other block MUX2 has six inputs of which three are for selection and supplies at its output the value of k for the selected direction.

From the first multiplexer MUX1 the values CorrMot and Med are output, the first of which is applied at input to a second fuzzy logic calculation block CALC2 while the second is supplied to a second arithmetic block 7 also indicated by the initials PROC2.

The second calculation block CALC2 is a machine designed to perform inference operations of a second fuzzy logic processing, described below.

The structure of the second arithmetic block 7 is shown in FIG. 4 and the arithmetic operations which are performed in it are explained below with reference to the filtering method in accordance with the present invention.

An arithmetic block indicated by the initials MEDIAN performs the determination of the mean value among some pixels of the work window and in particular among P2, P5, x.

An operating method of the device in accordance with an embodiment the present invention will now be provided with particular reference to FIG. 5 and to an initial state in which the digital codes of the individual pixels of a current image field and of an immediately preceding image field are presented at the input of the interface 2.

As stated above, the device in accordance with this embodiment of the present invention allows television signal scanning conversion. Specifically however said device is capable of following the structure of the signal fronts and operating a so-called soft-switching between the two interpolation modes, interfield and intrafield.

All this is achieved by the use of a system of rules based on fuzzy set theory by means of which are determined the presence of fronts and movement in the video image by making use of the information present in two consecutive fields.

The television signal is in interlaced format and comprises three components: Y for the luminance signal and U, V for the chrominance signal.

inside the device these three components undergo different types of processing.

The interpolation algorithm operates on the pixels contained inside a window, for example three by three in size, which moves through the entire image field.

This work window, which is shown if FIG. 5 comprises thus nine pixels. The first and last line of the window belong to the image field preceding the current one. Only the central pixel x belongs to the current image field and is thus the pixel to be processed.

As concerns the luminance component Y, one proceeds in the following manner.

A. For each of the directions P1–P6, P2–P5, P3–P4 the following parameters are calculated:

Corr=|Pi–Pj|

CorrMot=|(Pi+Pj)/2–X|

The parameter Corr has the job of identifying the correlation along a particular direction inside a given field while the parameter CorrMot has the dual function of reinforcing correct identification of the highest correlation direction if the image is static, i.e. detecting the presence of motion.

Indeed, if we consider a pixel belonging to a static region of the video image it can be reproduced without filtering so as to safeguard the display resolution. But if the pixel belongs to a region of the image in motion it is the interpolated value of said pixel which will be displayed.

B. Through the use of fuzzy logic, inference operations are performed in the calculation block CALC1. These inference operations are configured essentially as rules of the IF-THEN type with at least one initial or antecedent preposition and at least one consequent implication.

For each direction a fuzzy logic process is activated inside the calculation block CALC1 which accomplishes the inferences of the type:

IF Corr is (Low, High) AND CorrMot is (Low, High)
THEN k is (High, Low)

k in (kv, kd1, kd2) being relative to the vertical direction and diagonal directions +45° and −45° respectively.

The device 1 includes the blocks for provision of the processes operating in accordance with fuzzy logic and the interpolation algorithm is based on identification of mostly correlated directions obtained by means of such logical rules.

C. There is then selected the direction for which k has the highest value and thereafter the values of Corr and CorrMot refer to this selected direction. This highest value is selected in the block MAX and the corresponding direction is in turn selected.

D. It should be noted that when the central pixel lies on a line separating two regions with different shades of grey the fuzzy logic processing will detect a pixel in motion even though it is actually static. This fact introduces an edge attenuation effect.

This possible drawback is overcome by the subsequent fuzzy logic processing performed by the calculation block CALC2 which acts on the parameter CorrMot and produces a new parameter $k_{sm}$ whose value is in the range [0, 1].

The inference rules of the calculation block CALC2 which lead to evaluation of the parameter $k_{sm}$ are the following.

IF CorrMot is high THEN $k_{sm}$ is high.

E. The following calculation is then performed.

$$Y_h = k_{sm}*(Pi+Pj)/2 + (1-k_{sm})*Median(P2,P5,x) \quad (1)$$

where Median(P2, P5, x) restores the mean value of the indicated pixels.

This last result is a soft switch between the parameter Med and the mean value of (P2, P5, x).

F. The final formula is processed inside the block PROC2 of FIG. 4 and is the following.

$$Y_{out} = k*x + (1-k)*Y_h \quad (2)$$

where $Y_{out}$ is the output of the interpolator for the luminance component. The block PROC2 of FIG. 4 basically implements the formulas (1) and (2).

G. Once the direction of highest correlation has been identified by means of the above described operations performed on the component Y the following calculation is performed.

$$C_{out} = k*x_C + (1-k)*(P_{Ci}+P_{Cj})/2 \quad (3)$$

where $C_{out}$ is the output for the chrominance component, $P_{Ci}$ and $P_{Cj}$ are the chrominance components of the pixels $P_i$ and $P_j$ and lastly $x_C$ is the chrominance of the pixel x.

The block CHROMA is proposed for implementation of formula (3) with the parameter (PCi+PCj)/2 for the highest correlation direction.

Taken together, formulas (1), (2) and (3) allow provision of a soft switch based on fuzzy inference.

In conclusion, the device in accordance with the present invention solves the technical problem and achieves numerous advantages the first of which is that the television signal scanning conversion is adaptive.

Basically it is possible to detect accurately both the motion and the image field edges with good space and time adaptation.

Simulation tests performed by the applicant gave encouraging results in terms of overall performance compared with the classical algorithms of good performance based on mean filters which constitute a compromise solution in the cost/performance relationship.

These advantages become apparent both in the static images with greater definition of the edges and in the dynamic ones with better filtering of the blurring due to motion.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A television signal scanning conversion device comprising:

a filter having a plurality of digital inputs for receiving components of an interlaced television signal, an input for receiving a control signal and an output providing filtered components of the television interlaced signal according to at least one of different interpolation functions selected according to the control signal; and a fuzzy logic calculation block having inputs connected to the digital inputs of a filter and for receiving the components of the interlaced television signal and operating with fuzzy logic procedures applied to the received components to provide an output indicative of a direction of highest correlation of edges and motion detected in two consecutive image fields in the interlaced television signal, and wherein the output is connected to the control signal input of the filter to control the filter.

2. The device of claim 1, wherein the fuzzy logic calculation block receives a luminance component of the interlaced television signal.

3. The device of claim 1, wherein the fuzzy logic calculation block includes an arithmetic block having inputs connected to the digital inputs and which calculates mean parameters of the received components of the interlaced television signal, and wherein the fuzzy logic procedures include an inference operation having an antecedent preposition including the mean parameters calculated by the arithmetic block.

4. The device of claim 1, wherein the fuzzy logic calculation block is connected to a subset of said digital inputs and has outputs providing values indicative of correlation in a direction, the device further comprising:

a second calculation block having inputs connected to the outputs of the fuzzy logic calculation block and which determines a maximum value among values received at the inputs and enables respective output lines according to the determined maximum value, wherein the output lines are connected to at least one multiplexer which provides an output for controlling the filter.

5. The device of claim 4, further comprising a second fuzzy logic calculation block having an input connected to the output of the multiplexer and providing a second output for controlling the filter.

6. The device of claim 4, wherein the filter includes a circuit block acting on a chrominance component of the interlaced television signal, connected to a sub-assembly of said digital inputs and connected to the output of the multiplexer.

7. The device of claim 1, wherein the output of the filter is generated according to a combination of a first interpolation function and a second interpolation function, wherein the combination is determined according to the control signal.

8. A television signal conversion device, comprising:

an interface having an input for receiving a current pixel of an interlaced television signal and an output providing a plurality of signals indicative of pixels in an adjacent image in the interlaced television signal around the first pixel; and a first processor having an input for receiving the plurality of signals and an output providing a switching signal according to a function of the plurality of signals and indicative of a direction of highest correlation of edges and motion in two consecutive image fields of the interlaced television signal;

a second processor for performing an interpolation function on the current pixel of the interlaced television signal according to the switching signal to generate filtered components of the interlaced television signal, wherein the second processor performs a first interpolation function when the switching signal is in a first state and a second interpolation function when the switching signal is in a second state.

9. The device of claim 8, wherein said first processor operates on a luminance component of the received plurality of signals.

10. The device of claim 8, wherein the first processor includes an arithmetic block connected to the received plurality of signals and which calculates mean parameters of components of an image field of the television signal according to the received plurality of signals, and wherein the function performed by the first processor includes a fuzzy logic inference operation including an antecedent preposition including the mean parameters calculated by the arithmetic block.

11. The device of claim 8, wherein the first processor includes:

a plurality of first calculation blocks, wherein each first calculation block has inputs connected to a subset of said digital inputs and an output providing a function of the inputs indicative of correlation in a direction, and a second calculation block having inputs connected to the outputs of the first calculation blocks and which determines a maximum value among values received at the inputs and enables respective output lines according to the determined maximum value, wherein the output lines are connected to at least one multiplexer which provides an output for controlling the second processor.

12. The device of claim 11, further comprising a fuzzy logic calculation block having an input connected to the output of the multiplexer and an output for controlling the first processor.

13. The device of claim 11, further comprising a third processor having inputs receiving a chrominance component of the interlaced television signal by connection to a sub-assembly of the outputs of the interface and an input connected to an output of the multiplexer and an output providing a filtered chrominance component.

14. The device of claim 8, wherein the output of the second processor is generated according to a combination of a first interpolation function and a second interpolation function, wherein the combination is determined according to the switching signal.

15. A method for television signal scanning conversion, comprising the steps of:

receiving components of an interlaced television signal;

performing fuzzy logic procedures on the received components to determine a value indicative of a direction of highest correlation of edges and motion in two consecutive image fields of the interlaced television signal; and performing at least one of two different interpolation processes on the received components of the interlaced television signal to generate filtered components of the television signal, wherein the interpolation function is selected according to the determined value.

16. The method of claim 15, wherein the received components are luminance components of the television signal.

17. The method of claim 15, wherein the step of performing fuzzy logic procedures includes the step of calculating mean parameters of an image field in the interlaced television signal according to pixels of the image field and the step of performing inference operations using antecedent prepositions including the calculated mean parameters.

18. The method of claim 15, wherein the step of performing fuzzy logic operations includes determining a value indicative of correlation a direction for each of a plurality of subassemblies of the received components using fuzzy logic, and determining a highest value of the determined values, and wherein the step of filtering includes selecting a filtering operation according to the highest value.

19. The method of claim 18, further comprising the step of filtering a chrominance component of the interlaced television signal.

20. The method of claim 15, wherein the step of performing at least one of two different interpolation processes includes the step of performing a combination of a first interpolation function and a second interpolation function, wherein the combination is determined according to the determined value.

21. A television signal scanning conversion device, comprising:

a filter having a plurality of digital inputs for receiving components of an interlaced television signal, an input for receiving a control signal, and an output providing filtered components of the interlaced television signal according to a combination of a first interpolation function and a second interpolation function, wherein the combination is determined according to the control signal; and a fuzzy logic calculation block having inputs connected to the digital inputs of the filter and for receiving the components of the interlaced television signal and operating with fuzzy logic procedures applied to the received components to provide an output indicative of a direction of highest correlation in two consecutive image fields in the interlaced television signal, and wherein the output is connected to the control signal input of the filter.

22. A television signal conversion device, comprising:

an interface having an input for receiving a current pixel of an interlaced television signal and an output providing a plurality of signals indicative of pixels in an adjacent image in the interlaced television signal around the first pixel; and a first processor having an input for receiving the plurality of signals and an output providing a switching signal according to a function of the plurality of signals and indicative of a direction of highest correlation in two consecutive image fields of the interlaced television signal;

a second processor for performing an interpolation function on the current pixel of the interlaced television signal according to the switching signal to generate filtered components of the interlaced television signal, wherein the second processor performs a combination of a first interpolation function and a second interpolation function, wherein the combination is determined according to the switching signal.

23. A method for television signal scanning conversion, comprising the steps of:

receiving components of an interlaced television signal;

performing fuzzy logic procedures on the received components to determine a value indicative of a direction of highest correlation in two consecutive image fields of the interlaced television signal; and performing a combination of two different interpolation processes on the received components of the interlaced television signal to generate filtered components of the interlaced television signal wherein the combination is determined according to the determined value.

* * * * *